US010757490B2

(12) United States Patent
Siwko et al.

(10) Patent No.: US 10,757,490 B2
(45) Date of Patent: *Aug. 25, 2020

(54) METHOD AND APPARATUS FOR TRANSPORTING DETERMINISTIC TRAFFIC IN A GIGABIT PASSIVE OPTICAL NETWORK

(71) Applicant: AT&T Intellectual Property I, L.P., Atlanta, GA (US)

(72) Inventors: John Siwko, Austin, TX (US); Andrew Jeffrey Hall, Round Rock, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/032,753

(22) Filed: Jul. 11, 2018

(65) Prior Publication Data

US 2018/0324506 A1    Nov. 8, 2018

Related U.S. Application Data

(63) Continuation of application No. 15/599,007, filed on May 18, 2017, now Pat. No. 10,051,351, which is a (Continued)

(51) Int. Cl.
*H04J 14/08* (2006.01)
*H04Q 11/00* (2006.01)
(Continued)

(52) U.S. Cl.
CPC ....... *H04Q 11/0067* (2013.01); *H04B 10/272* (2013.01); *H04J 3/1694* (2013.01);
(Continued)

(58) Field of Classification Search
CPC ....... H04Q 11/0067; H04Q 2011/0084; H04Q 2011/0064; H04J 14/08; H04J 3/1694; H04B 10/272
See application file for complete search history.

(56) References Cited

U.S. PATENT DOCUMENTS 3,927,269 A * 12/1975 Yoshino ............... H04J 3/1605
                                                      348/24
5,959,999 A    9/1999 An
(Continued)

OTHER PUBLICATIONS

U.S. Appl. No. 15/599,007, filed May 18, 2017.
(Continued)

*Primary Examiner* — Mounir Moutaouakil
(74) *Attorney, Agent, or Firm* — Chiesa Shahinian & Giantomasi PC

(57) ABSTRACT

A system and method are disclosed for transporting deterministic traffic in a gigabit passive optical network. A system that incorporates teachings of the present disclosure may include, for example, an Optical Line Termination (OLT) for exchanging data traffic in a Gigabit Passive Optical Network (GPON) having a controller programmed to generate a timeslot schedule for transport of a desired bandwidth of constant bit rate (CBR) data traffic by selecting one or more timeslots from periodic frame clusters operating according to a GPON Transmission Convergence (GTC) protocol. Additional embodiments are disclosed.

11 Claims, 5 Drawing Sheets

Related U.S. Application Data continuation of application No. 14/687,503, filed on Apr. 15, 2015, now Pat. No. 9,699,533, which is a continuation of application No. 13/863,239, filed on Apr. 15, 2013, now Pat. No. 9,036,500, which is a continuation of application No. 12/847,889, filed on Jul. 30, 2010, now Pat. No. 8,422,390, which is a continuation of application No. 11/426,212, filed on Jun. 23, 2006, now Pat. No. 7,768,936.

(51) Int. Cl.
*H04B 10/272* (2013.01)
*H04J 3/16* (2006.01)

(52) U.S. Cl.
CPC ...... *H04J 14/08* (2013.01); *H04Q 2011/0064* (2013.01); *H04Q 2011/0084* (2013.01)

(56) References Cited

U.S. PATENT DOCUMENTS

| | | | |
|---|---|---|---|
| 6,091,740 A | 7/2000 | Karasawa | |
| 6,400,699 B1 | 6/2002 | Airy et al. | |
| 6,580,723 B1 | 6/2003 | Chapman | |
| 6,721,290 B1 | 4/2004 | Kondylis et al. | |
| 6,882,658 B1* | 4/2005 | Rudd | H04B 7/2656 370/442 |
| 7,058,040 B2* | 6/2006 | Schmidt | H04B 7/2653 370/337 |
| 7,170,877 B2* | 1/2007 | Livet | H04L 47/14 370/337 |
| 7,177,314 B2 | 2/2007 | Wu | |
| 7,301,955 B1 | 11/2007 | Tryfonas | |
| 7,444,419 B2 | 10/2008 | Green | |
| 7,768,936 B2 | 8/2010 | Siwko et al. | |
| 8,422,390 B2 | 4/2013 | Siwko et al. | |
| 8,983,478 B2* | 3/2015 | Legg | H04B 7/2656 455/450 |
| 9,036,500 B2 | 5/2015 | Siwko | |
| 9,699,533 B2 | 7/2017 | Siwko et al. | |
| 2002/0038393 A1* | 3/2002 | Ganapathy | G06F 13/28 710/22 |
| 2002/0101839 A1* | 8/2002 | Farley | H04L 5/0055 370/329 |
| 2002/0163695 A1 | 11/2002 | Unitt et al. | |
| 2003/0002537 A1* | 1/2003 | Schaller | H04J 3/0685 370/503 |
| 2003/0179769 A1 | 9/2003 | Shi et al. | |
| 2004/0109689 A1 | 6/2004 | Song et al. | |
| 2004/0214582 A1* | 10/2004 | Lan | H04W 72/02 455/452.2 |
| 2005/0083178 A1* | 4/2005 | Friedrich | G06K 7/0008 340/10.2 |
| 2005/0105562 A1 | 5/2005 | Downing et al. | |
| 2005/0158048 A1 | 7/2005 | Sung et al. | |
| 2006/0126641 A1* | 6/2006 | Song | H04J 3/1617 370/395.51 |
| 2006/0147207 A1 | 7/2006 | Den Hollander et al. | |
| 2006/0209711 A1 | 9/2006 | Kerpez | |
| 2006/0233197 A1 | 10/2006 | Elmoalem et al. | |
| 2006/0268791 A1* | 11/2006 | Cheng | H04W 72/1278 370/338 |
| 2007/0002871 A1 | 1/2007 | Pekonen et al. | |
| 2008/0123602 A1* | 5/2008 | Beek | H04B 7/0617 370/336 |

OTHER PUBLICATIONS

U.S. Appl. No. 14/687,503, filed Apr. 15, 2015, now U.S. Pat. No. 9,699,533.
U.S. Appl. No. 13/863,239, filed Apr. 15, 2013, now U.S. Pat. No. 9,036,500.
U.S. Appl. No. 12/847,889, filed Jul. 30, 2010, now U.S. Pat. No. 8,422,390.
U.S. Appl. No. 11/426,212, filed Jun. 23, 2006, now U.S. Pat. No. 7,768,936.
International Search Report & Written Opinion dated Nov. 14, 2007, in connection with International Patent Notification No. PCT/US2007/070331, 10 pgs.
Angelopoulos et al., "Efficient Transport of Packets with QOS in an FSAN-Aligned GPON," IEEE Communications Magazine, IEEE Service Center, NY, NY, vol. 42, No. 2, Feb. 2004, pp. 92-98.
"Gigabit-Capable Passive Optical Networks (G-PON): Transmission Convergence Layer Specification; G.984.3 (Feb. 2004)," ITU Standard in Force (I), International Telecommunication Union, Geneva, CN, No. G9843 2/4, Feb. 22, 2004.
Leligou et al., "Efficient Medium Arbitration of FSAN-Compliant GPONs," Internal Journal of Communication Systems; pp. 603-617, Published online Nov. 14, 2005, in Wiley InterScience (www.interscience.com).
Xie Jing et al., "A Dynamic Bandwidth Allocation Scheme for Differentiated Services in EPONs," IEEE Communications Magazine, IEEE Service Center, Piscataway, U.S., vol. 42, No. 8, Aug. 2004, pp. S32-S39.
Examiner's Report dated Feb. 21, 2011, in connection with Canadian Patent Application No. 2,650,504, 3 pgs.

* cited by examiner

100

METHOD AND APPARATUS FOR TRANSPORTING DETERMINISTIC TRAFFIC IN A GIGABIT PASSIVE OPTICAL NETWORK

This application is a continuation of U.S. patent application Ser. No. 15/599,007, filed May 18, 2017, now U.S. Pat. No. 10,051,351, which is a continuation of U.S. patent application Ser. No. 14/687,503, filed Apr. 15, 2015, now U.S. Pat. No. 9,699,533, which is a continuation of U.S. patent application Ser. No. 13/863,239, filed Apr. 15, 2013, now U.S. Pat. No. 9,036,500, which is a continuation of U.S. patent application Ser. No. 12/847,889, filed Jul. 30, 2010, now U.S. Pat. No. 8,422,390, which is a continuation of U.S. patent application Ser. No. 11/426,212, filed Jun. 23, 2006, now U.S. Pat. No. 7,768,936, all of which are herein incorporated by reference in their entirety.

FIELD OF THE DISCLOSURE

The present disclosure relates generally to gigabit passive optical networks, and more specifically to a method and apparatus for transporting deterministic traffic in said networks.

BACKGROUND

Gigabit passive optical network (GPON) is a communications access architecture recently developed by the International Telecommunications Union (ITU) Study Group 15 and published as standards ITU-T G.984.1 through ITU-T G.984.4.

This standard provides the flexibility for network elements in a GPON network to dynamically assign timeslots in frames during an active communications session. Reassignment of timeslots, however, can cause jitter and latency which in turn can cause undesirable interruptions and/or inoperability of a communication session involving constant bit rate (CBR) data traffic such as voice and or video. Additionally, CBR data traffic can be significantly interrupted during an Operations, Administrative and Management (OAM) cycle which utilizes up to two consecutive frames.

A need therefore arises for a method and apparatus for transporting deterministic traffic in a GPON network.

DETAILED DESCRIPTION

Embodiments in accordance with the present disclosure provide a method and apparatus for transporting deterministic traffic in GPON networks.

In a first embodiment of the present disclosure, an Optical Line Termination (OLT) for exchanging data traffic in a Gigabit Passive Optical Network (GPON) can have a controller programmed to generate a timeslot schedule for transport of a desired bandwidth of CBR data traffic by selecting one or more timeslots from periodic frame clusters operating according to a GPON Transmission Convergence (GTC) protocol.

In a second embodiment of the present disclosure, an Optical Network Unit (ONU) for exchanging data traffic in a Gigabit Passive Optical Network (GPON) can have a controller programmed to receive a timeslot schedule from an Optical Line Termination (OLT) identifying one or more timeslots selected by the OLT from periodic frame clusters according to a desired bandwidth of at least one among Constant Bit Rate (CBR) and non-deterministic (ND) data traffic services associated with CBR and ND Transmission Containers (T-Conts) of the ONU, and transmit CBR and ND data traffic of the CBR and ND T-Conts according the timeslot schedule.

In a third embodiment of the present disclosure, a method can generate at an Optical Line Termination (OLT) a schedule for transport of Constant Bit Rate (CBR) data traffic in a Gigabit Passive Optical Network (GPON), wherein the schedule identifies one or more data units selected by the OLT from periodic data clusters according to a desired bandwidth of the CBR data traffic.

Figure 1:
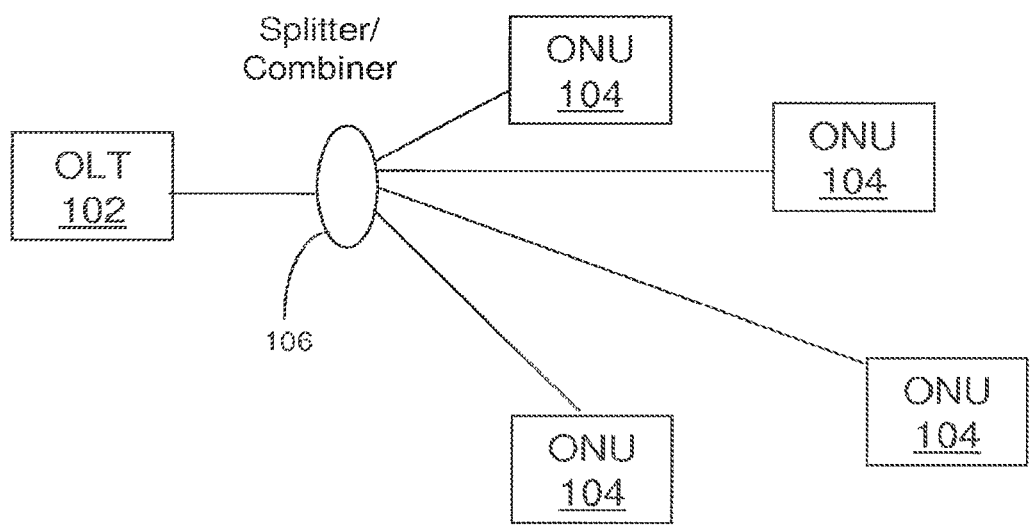
FIG. 1 depicts an exemplary embodiment of a portion of a Gigabit passive optical network (GPON) communication system.

FIG. 1 depicts an exemplary embodiment of a portion of a Gigabit Passive Optical Network (GPON) communication system 100. The GPON communication system 100 comprises an Optical Line Termination (OLT) 102 coupled to one or more Optical Network Units (ONUs) 104 by way of one or more common splitters or combiners 106. The OLT 102 and ONUs 104 operate according to a GPON Transmission Convergence (GTC) protocol and utilize a controller comprising common computing technology for routing digital traffic between end points of the GPON communication system 100. Digital traffic can include Constant Bit Rate (CBR) traffic such as a voice and/or video, non-deterministic traffic such as common Internet traffic, and Operations, Administrative and Management (OAM) data traffic represented by network management functions that provide network fault indication, ONU initialization, performance information, and data and diagnosis functions among other things.

Figure 2:
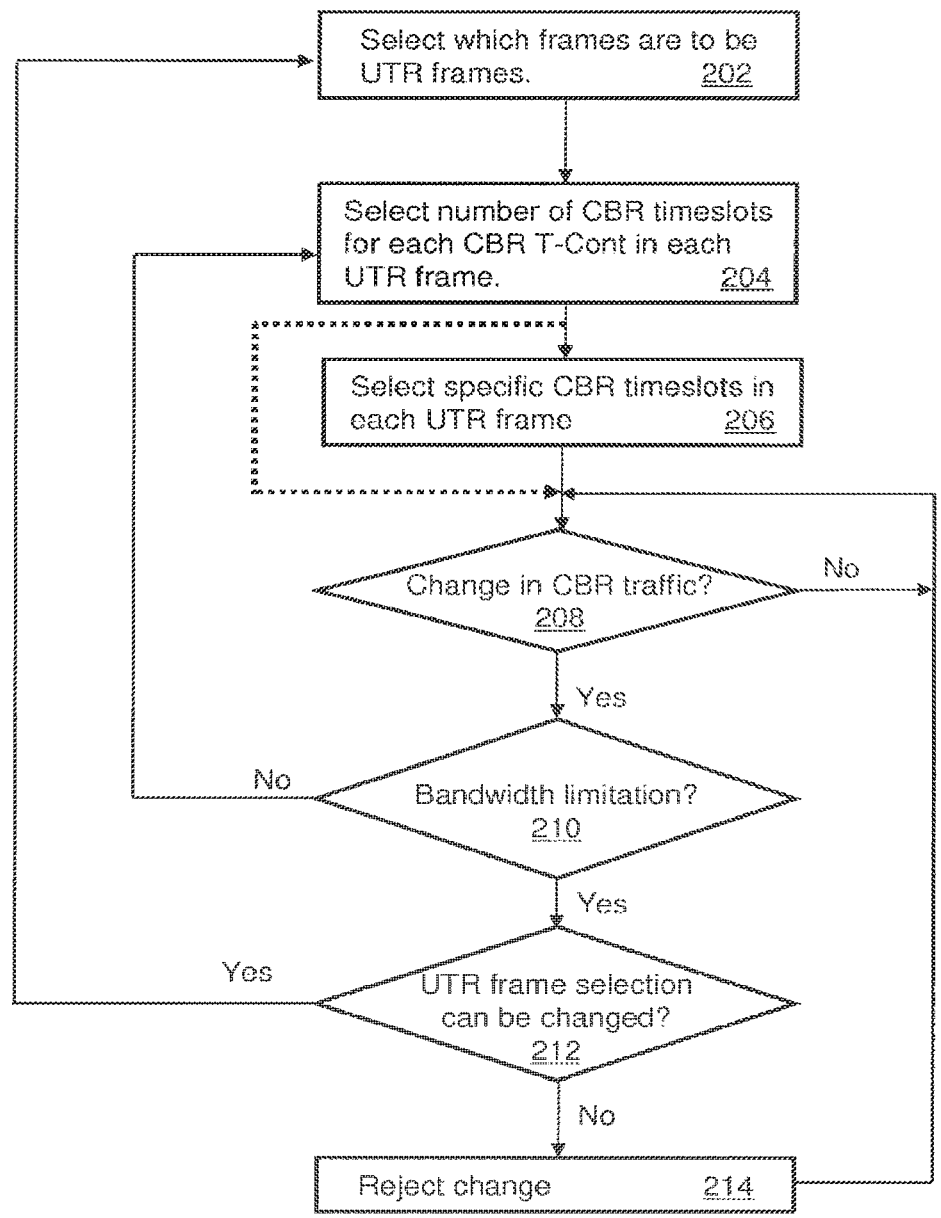
FIGS. 2-3 depict exemplary methods operating in the GPON communication system.
Figure 3:
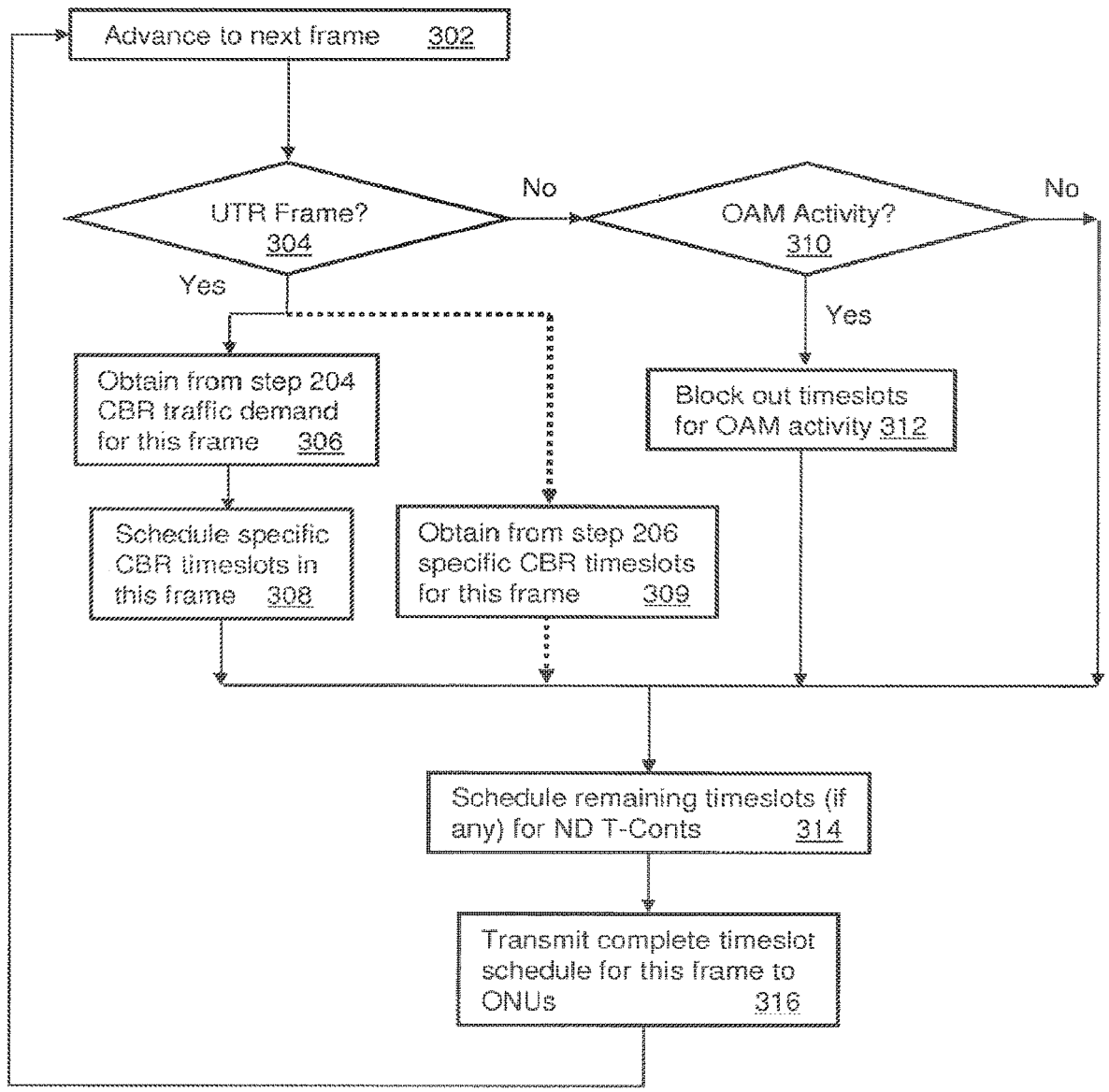
Figure 4:
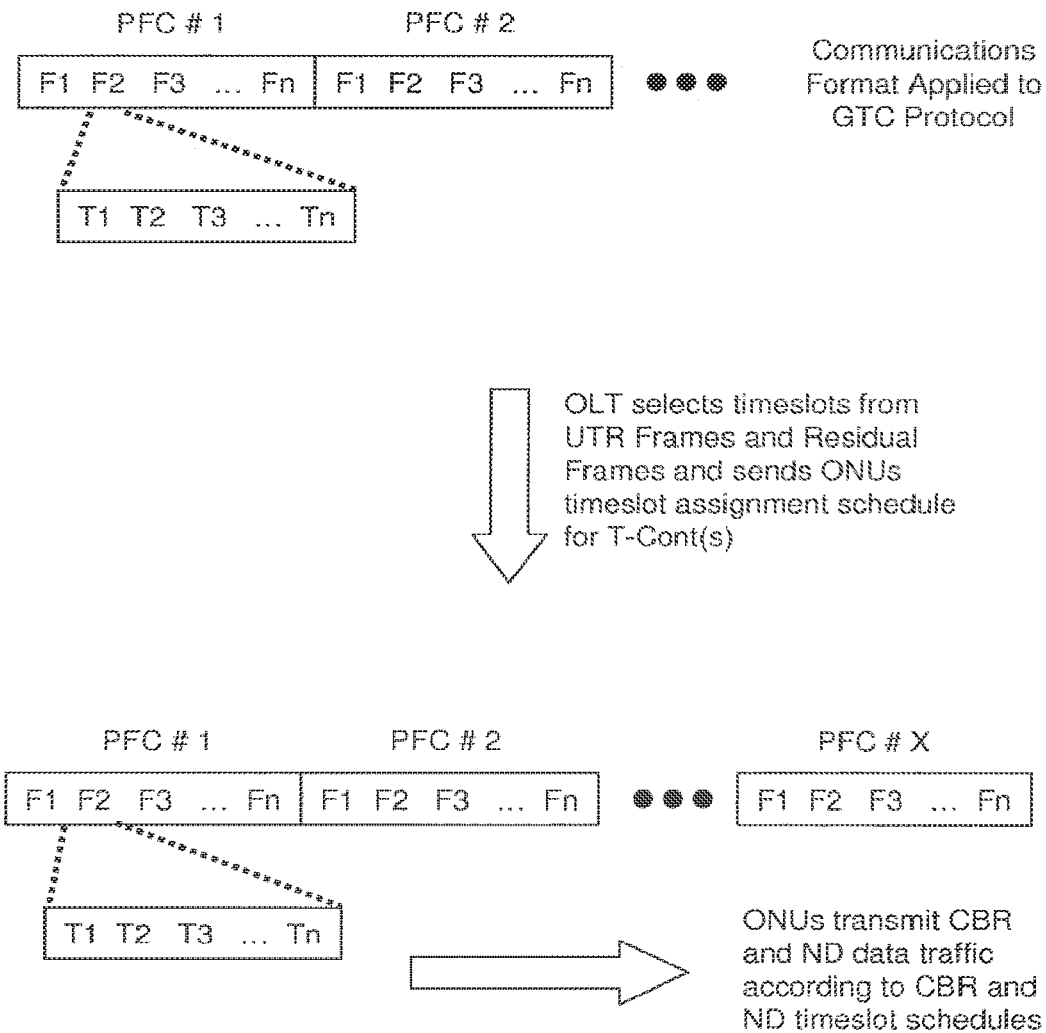
FIG. 4 depicts and exemplary block diagram of GTC frame and timeslot assignment according to the methods of FIGS. 2-3.

FIGS. 2-3 depict exemplary methods 200-300 operating in the OLT 102 of communication system 100. Method 200 describes a means for selecting frames and timeslots, while method 300 depicts a complementary method for assigning timeslots. To reduce jitter and latency due to dynamic timeslot assignments in prior art GPON communication systems, the OLT 102 can be programmed in step 202 to organize GTC frames into periodic frame clusters (PFCs) (see FIG. 4). From the PFCs the OLT 102 can be programmed in step 202 to select a portion of said GTC frames as reserved for CBR and non-deterministic (ND) data traffic ("User Traffic Reserved Frames") while the remaining portion of said GTC frames is available for ND data traffic, and Operations, Administrative and Management (OAM) data traffic ("Residual Frames").

In step 204, the OLT 102 selects a number (which could be zero) of timeslots (not actual timeslot assignments) in each UTR frame for each CBR Transmission Container (T-Cont) of the ONUs 104. The numbers of timeslots granted to the CBR T-Conts may (and is likely to) form a repeating pattern whose period may last one or more PFCs. A T-Cont represents a logical grouping of data ports of a corresponding ONU 104 having similar service characteristics. Timeslot assignments are granted by the OLT 102 to each T-Cont of an ONU 104. The number of timeslots selected for a particular T-Cont can depend on a desired bandwidth for each data traffic stream associated with the T-Cont. The OLT 102 can determine or assume bandwidth requirements for each CBR T-Cont through a variety of means well known to artisans of ordinary skill in the art. For example, from the OLT 102 can have pre-provisioned information, or can receive signaling information originating at any number of network elements (including the ONUs 104) in the GPON communication system 100.

Once the UTR frames and number of timeslots have been selected for each T-Cont, the OLT 102 can proceed in a first embodiment to step 208 where it checks for bandwidth changes in the CBR traffic. If there is no change, the OLT 102 continues to operate with the frame assignments, and the numbers of timeslots selected in step 204. If on the other hand a CBR traffic change is requested or detected in step 208, the OLT 102 proceeds to step 210 where it checks if there's a bandwidth limitation with the current UTR frame assignment. This step is particularly important when the CBR traffic has increased in bandwidth. If the CBR traffic bandwidth has increased, and there's available bandwidth to support this change, then the OLT 102 proceeds to step 204 where it selects a greater number of timeslots. If the CBR traffic bandwidth has been reduced, then the OLT 102 proceeds to step 204 where it reduces the number of timeslots assigned to the CBR traffic in the UTR frames.

When a bandwidth limitation is detected in step 210 in which no additional timeslots are available to support an increase in CBR traffic, the OLT 102 proceeds to step 212 and determines if the UTR frame selection can be changed. For example, suppose there are 24 GTC frames in a PFC with 20 of said frames (F1 through F20) assigned as UTR Frames, and 4 frames (F21 through F24) assigned to Residual Frames. Suppose further that the only system consideration is that at least 2 GTC frames in each PFC must be Residual Frames. In this instance, since the Residual Frames do not require more than 2 GTC frames to support OAM cycles, the OLT 102 can proceed to steps 202-204 and select a new set of frames and a new number of timeslots to support the change in CBR traffic. If instead 22 out of the 24 UTR frames in a PFC had been previously assigned to UTR traffic, then the OLT 102 would have no choice but to proceed to step 214 and reject the request to increase CBR traffic since at least two frames must be reserved for OAM cycles.

In another embodiment, the OLT 102 can be programmed in step 206 to assign specific CBR timeslots to each UTR frame over one or more UTR frames of a PFC cycle. This step can reduce jitter by creating a static and regular timeslot pattern for CBR traffic across multiple UTR frames. Steps 202-214 thus provide a means for defining UTR frames and Residual Frames with dynamic timeslot assignments in one embodiment, and static timeslot assignments in another.

FIG. 3 illustrates method 300 which describes the steps to assign timeslots in each GTC frame of the PFCs. Method 300 begins with step 302 in which the OLT 102 advances to perform timeslot assignments for the next GTC frame. In step 304, the OLT 102 checks whether the GTC frame it has advanced to is a UTR frame or a Residual frame. If it is a UTR frame, then in one embodiment the OLT 102 proceeds to step 306 where it obtains from step 204 the number of timeslots to be assigned in this frame to each CBR T-Cont. In step 308, the OLT 102 uses the obtained numbers to schedule specific timeslots in this UTR frame to CBR T-Conts. In step 314, the OLT 102 schedules the remaining timeslots (if any are available) to ND T-Conts. The timeslot schedule is then transmitted in step 316 to the T-Conts of the ONUs 104 which transmit CBR and ND traffic upstream according to this schedule. The OLT 102 then proceeds to step 302 where it repeats another cycle of method 300 for a GTC frame.

Steps 306-308 assume an embodiment in which the OLT 102 does not assign static timeslots, but rather reserves a number of timeslots for each UTR frame. In this embodiment, timeslots are assigned dynamically for each UTR frame. Although a dynamic assignment can cause some additional jitter and/or latency, the flexibility to assign timeslots provides for a means to manage the operation of fiber optic equipment such as lasers to reduce the on and off cycles which can cause a loss of timeslot usage. To better manage the dynamic scheduling of timeslots for CBR and ND T-Conts, steps 308 & 314 can be combined as one step to minimize the power cycling of fiber optic lasers.

In an alternative embodiment, the OLT 102 can be programmed to proceed from step 304 to step 309 where it obtains from step 206 the specific timeslots assigned to CBR T-Conts in this UTR frame. This embodiment provides a static assignment of timeslots. Although it can have an impact on the power cycling of fiber optic lasers, it helps to reduce jitter and latency for time sensitive CBR traffic. Once the CBR schedule has been determined, the OLT 102 proceeds as before to step 314 and assigns the remaining timeslots to the ND T-Conts, and transmits in step 316 the timeslot schedule to the T-Conts of the ONUs 104 which transmit CBR and ND traffic upstream according to this schedule. The OLT 102 then proceeds to step 302 where it repeats another cycle of method 300 for a GTC frame.

Referring back to step 304, if the GTC frame in question belongs to the Residual Frames, then the OLT 102 proceeds to step 310 where it checks whether OAM activity needs to occur. If OAM activity is not required, then the OLT 102 proceeds to step 314 where it assigns all available timeslots of the unused Residual Frames to the ND T-Conts, and proceeds to step 316 as described earlier. If on the other hand, OAM activity is required, the OLT 102 proceeds to step 312 where it blocks out timeslots for OAM activity. The number of timeslots can be as many as two full frames scheduled over one or more PFC cycles. As before, the OLT 102 assigns timeslots to the ND T-Conts if timeslots are available, and proceeds to step 316 to transmit the timeslot schedule to the ONUs 104.

It would be evident to an artisan with ordinary skill in the art that the aforementioned embodiments can be modified, reduced, or enhanced without departing from the scope and spirit of the claims described below. For example, the OLT 102 can be programmed to select static timeslots for time sensitive CBR traffic, and dynamically select timeslots for other less sensitive CBR traffic. This is but one example of modifications that can be applied to the present disclosure. Accordingly, the reader is directed to the claims below for a fuller understanding of the breadth and scope of the present disclosure.

Figure 5:
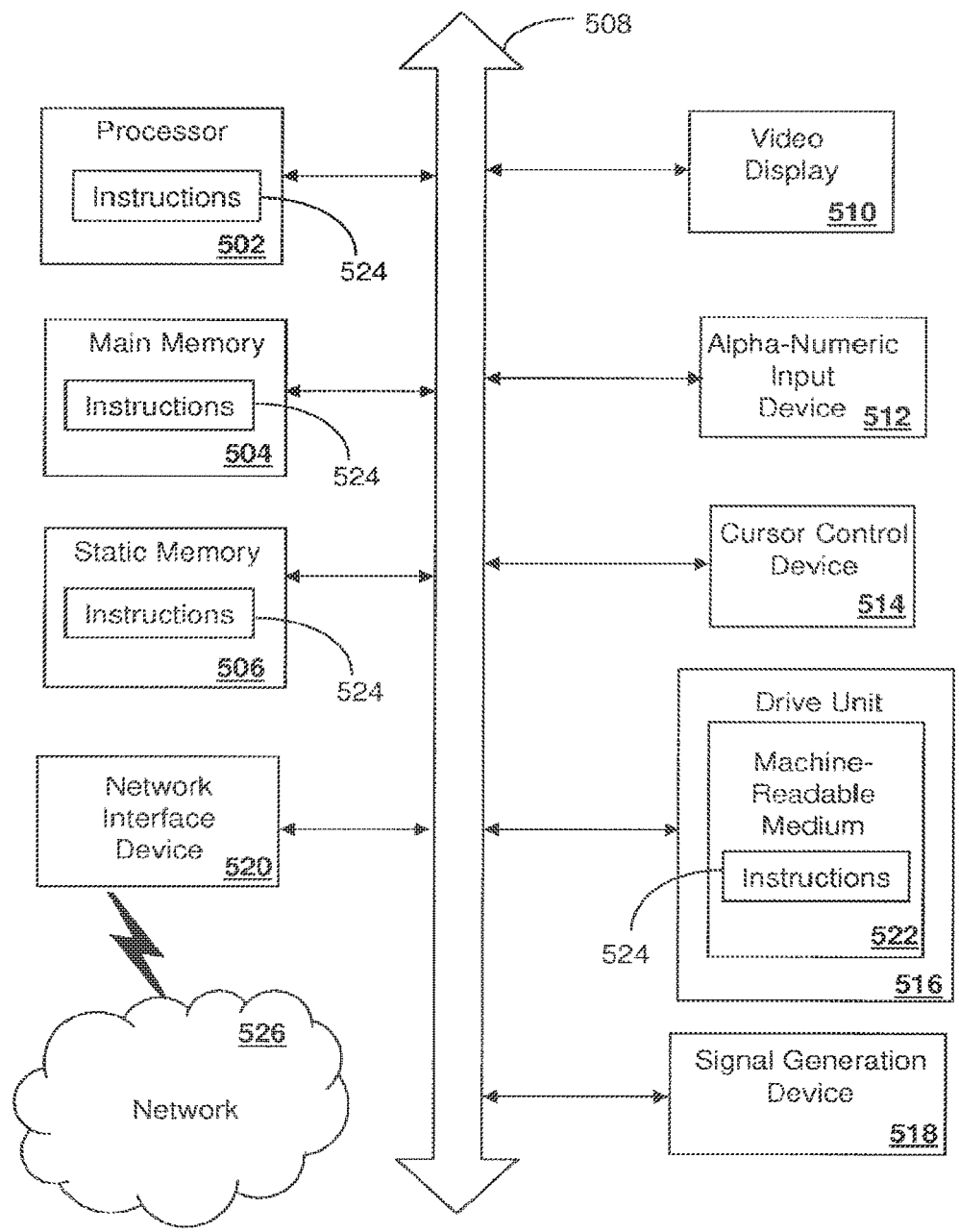
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD)), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for adjusting a time slot schedule comprising a first set of timeslots for transmitting a first type of data to a destination and a second set of timeslots for transmitting a second type of data to the destination, the method comprising:
   detecting a change in an amount of the first type of data to be transmitted to the destination;
   determining whether a change in an assignment of the first set of timeslots and a change in an assignment of the second set of timeslots supports the change in the amount of the first type of data to be transmitted to the destination; and
   generating a new timeslot schedule comprising a plurality of timeslots of a periodic frame cluster in response to the detecting and the determining, wherein the generating the new timeslot schedule comprises increasing a number of the plurality of timeslots of the periodic frame cluster in response to determining that the change in the assignment of the first set of timeslots and the change in the assignment of the second set of timeslots does not support the change in the amount of the first type of data to be transmitted.

2. The method of claim 1, wherein the generating the new timeslot schedule further comprises changing a number of timeslots assigned to the first set of timeslots and changing a number of timeslots assigned to the second set of timeslots.

3. The method of claim 2, wherein the plurality of timeslots comprises the first set of timeslots and the second set of timeslots, the first type of data designated for user data traffic and the second type of data designated for management data traffic.

4. The method of claim 1,
   wherein the generating the new timeslot schedule further comprises selecting specific timeslots to create a timeslot pattern across multiple periodic frame clusters.

5. An apparatus for adjusting a time slot schedule comprising a first set of timeslots for transmitting a first type of data to a destination and a second set of timeslots for transmitting a second type of data to the destination, the apparatus comprising:
   a processor; and
   a memory to store computer program instructions, the computer program instructions when executed on the processor cause the processor to perform operations comprising:
   detecting a change in an amount of the first type of data to be transmitted to the destination;
   determining whether a change in an assignment of the first set of timeslots and a change in an assignment of the second set of timeslots supports the change in the amount of the first type of data to be transmitted to the destination; and
   generating a new timeslot schedule comprising a plurality of timeslots of a periodic frame cluster in response to the detecting and the determining, wherein the generating the new timeslot schedule comprises increasing a number of the plurality of timeslots of the periodic frame cluster in response to determining that the change in the assignment of the first set of timeslots and the change in the assignment of the second set of timeslots does not support the change in the amount of the first type of data to be transmitted.

6. The apparatus of claim 5, wherein the generating the new timeslot schedule further comprises changing a number of timeslots assigned to the first set of timeslots and changing a number of timeslots assigned to the second set of timeslots.

7. The apparatus of claim 6, wherein the plurality of timeslots comprises the first set of timeslots and the second set of timeslots, the first type of data designated for user data traffic and the second type of data designated for management data traffic.

8. The apparatus of claim 5,
   wherein the generating the new timeslot schedule further comprises selecting specific timeslots to create a timeslot pattern across multiple periodic frame clusters.

9. A computer readable storage device storing computer program instructions for adjusting a time slot schedule comprising a first set of timeslots for transmitting a first type of data to a destination and a second set of timeslots for transmitting a second type of data to the destination, which, when executed on a processor, cause the processor to perform operations comprising:
   detecting a change in an amount of the first type of data to be transmitted to the destination;
   determining whether a change in an assignment of the first set of timeslots and a change in an assignment of the second set of timeslots supports the change in the amount of the first type of data to be transmitted to the destination; and
   generating a new timeslot schedule comprising a plurality of timeslots of a periodic frame cluster in response to the detecting and the determining, wherein the generating the new timeslot schedule comprises increasing a number of the plurality of timeslots of the periodic frame cluster in response to determining that the change in the assignment of the first set of timeslots and the change in the assignment of the second set of timeslots does not support the change in the amount of the first type of data to be transmitted.

10. The computer readable storage device of claim 9, wherein the generating the new timeslot schedule further comprises changing a number of timeslots assigned to the first set of timeslots and changing a number of timeslots assigned to the second set of timeslots.

11. The computer readable storage device of claim 10, wherein the plurality of timeslots comprises the first set of timeslots and the second set of timeslots, the first type of data designated for user data traffic and the second type of data designated for management data traffic.

* * * * *